(12) United States Patent
Okubo

(10) Patent No.: US 11,831,998 B2
(45) Date of Patent: Nov. 28, 2023

(54) IMAGE CAPTURING APPARATUS, CONTROL METHOD THEREOF, AND STORAGE MEDIUM

(71) Applicant: CANON KABUSHIKI KAISHA, Tokyo (JP)

(72) Inventor: Toshiyuki Okubo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/706,915

(22) Filed: Mar. 29, 2022

(65) Prior Publication Data

US 2022/0321761 A1 Oct. 6, 2022

(30) Foreign Application Priority Data

Apr. 1, 2021 (JP) ................ 2021-063005

(51) Int. Cl.
*H04N 23/745* (2023.01)
*H04N 23/63* (2023.01)

(52) U.S. Cl.
CPC ........... *H04N 23/745* (2023.01); *H04N 23/63* (2023.01)

(58) Field of Classification Search
CPC ...... H04N 23/745; H04N 23/63; H04N 13/44; H04N 7/0132
See application file for complete search history.

(56) References Cited

U.S. PATENT DOCUMENTS

| | | | |
|---|---|---|---|
| 2019/0166298 A1* | 5/2019 | Tasdizen | H04N 25/531 |
| 2019/0268525 A1* | 8/2019 | Okada | H04N 23/60 |
| 2021/0368089 A1* | 11/2021 | Shintani | H04N 23/745 |

FOREIGN PATENT DOCUMENTS

JP 2017-143404 A 8/2017

* cited by examiner

*Primary Examiner* — Lin Ye
*Assistant Examiner* — John H Morehead, III
(74) *Attorney, Agent, or Firm* — Cowan, Liebowitz & Latman, P.C.

(57) ABSTRACT

An image capturing apparatus comprising an image capturing unit; a flicker detection unit; and a control unit configured to cause, in parallel, an execution of a first image capturing operation in which the image capturing unit is caused to periodically capture an image for storage and a second image capturing operation in which the image capturing unit is caused to periodically capture an image for display, wherein the control unit: in the first image capturing operation, causes the image capturing unit to perform capturing in accordance with a peak timing of a flicker; and in a case where an accumulation period in the first image capturing operation and an accumulation period in the second image capturing operation overlap, changes a timing of capturing in the second image capturing operation.

14 Claims, 6 Drawing Sheets

IMAGE CAPTURING APPARATUS, CONTROL METHOD THEREOF, AND STORAGE MEDIUM

BACKGROUND OF THE INVENTION

Field of the Invention

The present invention relates to an image capturing apparatus.

Description of the Related Art

In recent years, image capturing apparatuses, such as home video cameras and digital still cameras, have become popular. These image capturing apparatuses have functions such as continuous image capturing and moving image capturing; therefore, a user's convenience in capturing has been improved. In addition, a mode in which capturing is performed only by a rolling slit readout of an image capturing element without using a mechanical shutter is also provided, which has the benefit that continuous capturing speed can be improved more than in capturing in which the mechanical shutter is operated.

If a light source is flickering during continuous image capturing or when capturing in a moving image capturing mode, striped noise appears in images, thereby reducing image quality.

In response to this flicker phenomenon, Japanese Patent Laid-Open No. 2017-143404 discloses a technique of reducing the effects of a flicker by compositing images in which accumulation periods have been limited.

However, in the technique disclosed in Japanese Patent Laid-Open No. 2017-143404, although it is possible to reduce the effects of a flicker, there is a problem that the degree of freedom of accumulation periods is reduced. Further, there is also a problem that, by compositing images, image quality deteriorates.

SUMMARY OF THE INVENTION

The present invention has been made in view of the problems described above and provides an image capturing apparatus capable of acquiring images of good quality with reduced effects of a flicker even during continuous capturing and moving image capturing.

According to a first aspect of the present invention, there is provided an image capturing apparatus comprising: at least one processor or circuit configured to function as following units; an image capturing unit configured to convert light from an object to an electrical signal; a flicker detection unit configured to detect a flicker of a light source using an image from the image capturing unit; and a control unit configured to cause, in parallel, an execution of a first image capturing operation in which the image capturing unit is caused to periodically capture an image for storage and a second image capturing operation in which the image capturing unit is caused to periodically capture an image for display, wherein the control unit: in the first image capturing operation, causes the image capturing unit to perform capturing in accordance with a peak timing of a flicker that has been detected by the flicker detection unit; and in a case where an accumulation period of the image capturing unit in the first image capturing operation and an accumulation period of the image capturing unit in the second image capturing operation overlap, changes a timing of capturing by the image capturing unit in the second image capturing operation.

According to a second aspect of the present invention, there is provided a method of controlling an image capturing apparatus comprising an image capturing unit configured to convert light from an object to an electrical signal, the method comprising: flicker detecting in which a flicker of a light source is detected using an image from the image capturing unit; and controlling in which a first image capturing operation in which the image capturing unit is caused to periodically capture an image for storage and a second image capturing operation in which the image capturing unit is caused to periodically capture an image for display are caused to be executed in parallel, wherein in the controlling: in the first image capturing operation, the image capturing unit is caused to perform capturing in accordance with a peak timing of a flicker that has been detected by the flicker detecting; and in a case where an accumulation period of the image capturing unit in the first image capturing operation and an accumulation period of the image capturing unit in the second image capturing operation overlap, a timing of capturing by the image capturing unit in the second image capturing operation is caused to be changed.

Further features of the present invention will become apparent from the following description of exemplary embodiments with reference to the attached drawings.

DESCRIPTION OF THE EMBODIMENTS

Figure 1:
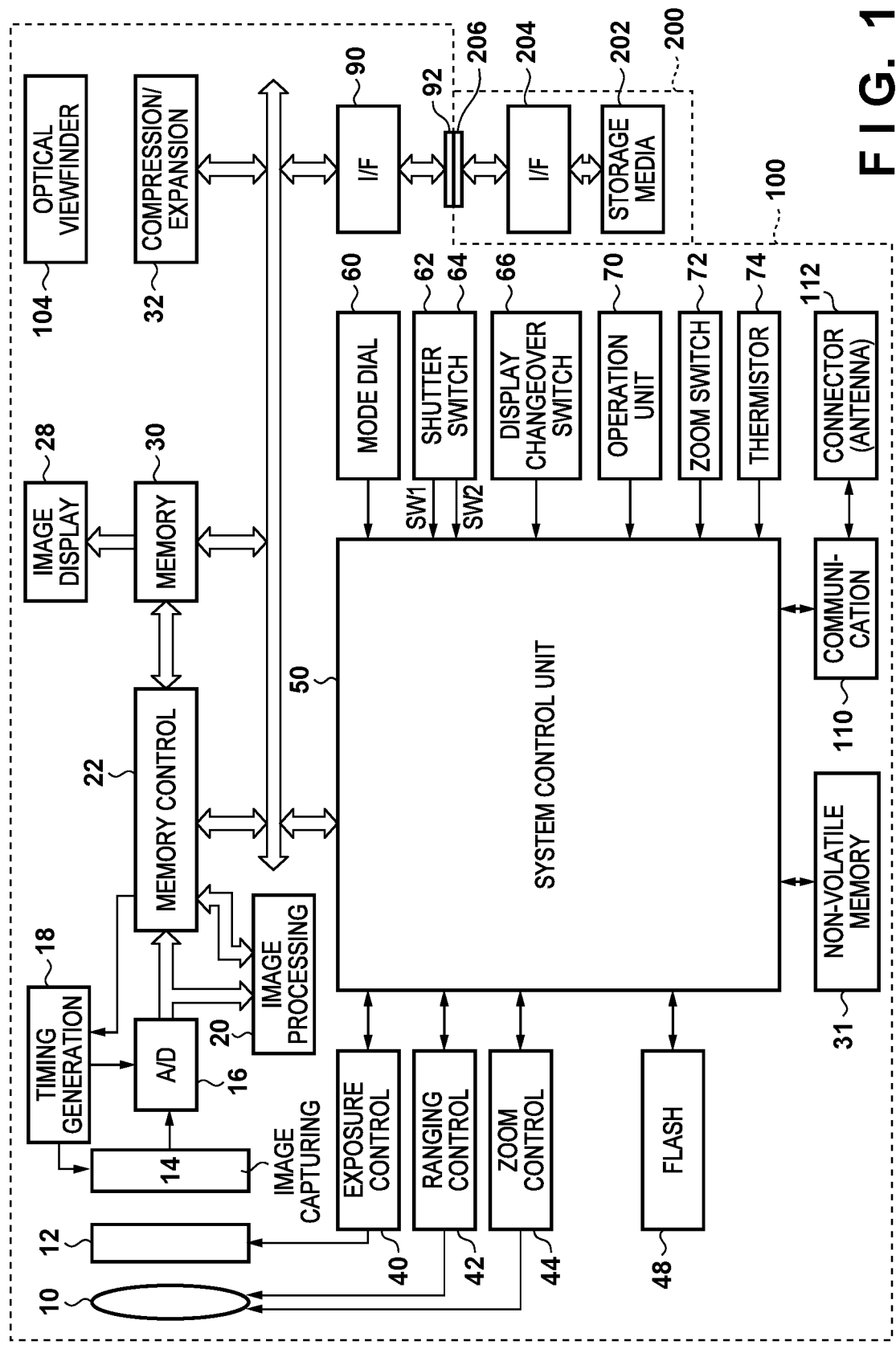
FIG. 1 is a diagram illustrating a configuration of a digital camera, which is an embodiment of an image capturing apparatus of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a diagram illustrating a configuration of a digital camera 100, which is an embodiment of an image capturing apparatus of the present invention.

In FIG. 1, the digital camera 100 includes an image capturing lens 10, a mechanical shutter 12 having an aperture function, an image capturing element 14 for converting an optical image into electrical signals, and an A/D converter 16 for converting analog output signals of the image capturing element 14 into digital signals. Here, the A/D converter 16 may be incorporated in the image capturing element 14.

A timing generation circuit 18 is a circuit for supplying clock signals and control signals to the image capturing element 14 and the A/D converter 16 and is controlled by a memory control circuit 22 and a system control circuit 50. The control of an accumulation period of the image capturing element 14 is usually performed by the mechanical shutter 12 but can also be performed by a method other than using the mechanical shutter 12. That is, the accumulation period can be controlled with an electronic shutter realized by controlling the reset timing of the image capturing element 14, and this can be employed in moving image capturing and the like.

An image processing circuit 20 performs predetermined pixel interpolation processing and color conversion processing on data from the A/D converter 16 or data from the memory control circuit 22. Further, an electronic zoom function is realized by the image processing circuit 20 performing image cropping or scaling processing.

Further, the image processing circuit 20 performs predetermined computational processing using captured image data, and based on the obtained computational result, the system control circuit 50 controls an exposure control circuit 40 and a ranging control circuit 42, thereby performing TTL AF processing, AE processing, and EF processing.

The memory control circuit 22 controls the A/D converter 16, the timing generation circuit 18, the image processing circuit 20, a memory 30, and a compression/expansion circuit 32. Data from the A/D converter 16 is written to the memory 30 via the image processing circuit 20 and the memory control circuit 22 or via the memory control circuit 22.

An image display unit 28 comprises a TFT LCD or the like, and image data for display written in the memory 30 is displayed by the image display unit 28 via the memory control circuit 22. An electronic viewfinder function can be realized by sequentially displaying captured image data using the image display unit 28. Further, for the image display unit 28, a display can be freely turned ON/OFF by an instruction of the system control circuit 50, and when the display is turned OFF, the power consumption of the digital camera 100 can be significantly reduced.

The memory 30 is a storage unit for storing captured still images and moving images and is provided with a storage capacity sufficient for storing a predetermined number of still images or a predetermined length of time of moving images. This makes it possible to write a large number of images at a high speed to the memory 30 even in the case of continuous image capturing or panoramic image capturing in which a plurality of still images are continuously captured. The memory 30 can also be used as a work area for the system control circuit 50.

A non-volatile memory 31 is a storage unit configured by a FlashROM or the like. Program code to be executed by the system control circuit 50 is stored in the non-volatile memory 31 and is sequentially read out and executed. In addition, an area for storing system information and an area for storing user setting information are provided in the non-volatile memory 31, and various information and settings can be read out and restored at the next startup.

The compression/expansion circuit 32 is a circuit for compressing and expanding image data by adaptive discrete cosine transform (ADCT) or the like, reads out images stored in the memory 30, and performs compression processing or decompression processing and writes the processed data into the memory 30.

The exposure control circuit 40 is a circuit for controlling the shutter 12 having an aperture function and has a flash dimming function in tandem with a flash 48. The ranging control circuit 42 controls focusing of the image capturing lens 10, and a zoom control circuit 44 controls zooming of the image capturing lens 10.

The flash 48 also has an AF auxiliary light emission function and a flash dimming function. The exposure control circuit 40 and the ranging control circuit 42 perform exposure control and ranging control using the TTL method. The system control circuit 50 controls the exposure control circuit 40 and the ranging control circuit 42 based on the result of computation of captured image data by the image processing circuit 20. The system control circuit 50 controls the entire digital camera 100.

Operation members 60, 62, 64, 66, 70, and 72 are operation units for inputting instructions for various operations of the system control circuit 50 and are configured by one or a combination of a plurality of a switch, a dial, a touch panel, pointing by line-of-sight detection, a voice recognition device, and the like. Here, these operation units will be described in detail.

A mode dial switch 60 can switch between and set each function mode, such as power-off, automatic image capturing mode, image capturing mode, panorama image capturing mode, moving image capturing mode, reproduction mode, and PC connection mode.

A shutter switch 62 (SW1) turns ON part way through the operation of a shutter button and instructs to start the operation of AF (auto focus) processing, AE (auto exposure) processing, AWB (auto white balance) processing, and the like.

A shutter switch 64 (SW2) turns ON at completion operation of the shutter button. In the case of flash photography, after performing EF (pre-flash emission) processing, the image capturing element 14 is exposed for an exposure period determined by AE processing. The flash is emitted during this exposure period, and simultaneously with the end of exposure period, exposure of the image capturing element 14 is ended by the exposure control circuit 40 closing the shutter 12 and blocking light.

The shutter switch 64 (SW2) instructs a start of a series of processing operations: readout processing in which signals read out from the image capturing element 14 are written, as image data, into the memory 30 via the A/D converter 16 and the memory control circuit 22; development processing employing computation in the image processing circuit 20 and the memory control circuit 22; and storage processing in which image data is read out from the memory 30, compressed by the compression/expansion circuit 32, and then is written into the storage medium 202.

A display changeover switch 66 switches the display state of the image display unit 28. By interrupting the currents supplied to the image display unit comprising a TFT LCD or the like with this function, it becomes possible to attempt to reduce power consumption when performing capturing using an optical viewfinder 104.

An operation unit 70 comprises various buttons, a touch panel, a rotary dial, and the like and includes a menu button, set button, macro button, multi-screen/reproduction/page break button, flash setting button, single capturing/continuous capturing/self-timer switch button, and the like. A menu shift + (plus) button, menu shift − (minus) button, reproduced image shift + (plus) button, reproduced image shift −

(minus) button, image capturing quality selection button, exposure correction button, date/time setting button, and the like are included.

A zoom switch 72 functions as a zoom operation unit by which the user instructs to change the magnification of the captured image. The zoom switch 72 includes a telescope switch for changing the angle of view of image capturing to the telephoto side and a wide switch for changing the angle of view of image capturing to the wide-angle side. The zoom switch 72 is used to enable instruction of the zoom control circuit 44 to change the angle of view of capturing of the image capturing lens 10, and thereby an optical zoom operation can be performed. Further, it is also possible to crop images by the image processing circuit 20 as well as electrically change zooming of the angle of view of capturing by pixel interpolation processing or the like.

A thermistor 74 measures the temperature inside the camera. Since defective pixels of the image capturing element 14 are affected by temperature, it is necessary to change defective pixel correction processing in accordance with the temperature at the time of capturing. The thermistor is disposed near the image capturing element 14 in the digital camera 100 and measures the temperature of the image capturing element 14 itself.

An interface 90 is an interface with a storage unit 200 including a storage medium 202, such as a memory card or hard disk, and a connector 92 is a connector for connecting with the storage medium 202.

A barrier 102 is a protection unit for preventing dirtying and damaging of an image capturing unit, which includes the lens 10 of the digital camera 100, by covering the image capturing unit. The optical viewfinder 104 makes it possible to observe an object without using the electronic viewfinder function by the image display unit 28, and a photographer can perform capturing using only the optical viewfinder 104.

A communication unit 110 has various communication functions, such as a USB, IEEE 1394, LAN, and wireless communication. A connector 112 is a connector for connecting the digital camera 100 with other apparatuses by the communication unit 110 and, in the case of wireless communication, is an antenna.

The storage unit 200 performs storage using the storage medium 202, such as a memory card or hard disk. The storage unit 200 includes the storage medium 202 configured by a semiconductor memory, magnetic disk, or the like; an interface 204 with the digital camera 100; and a connector 206 for connecting with the digital camera 100.

Figure 2:
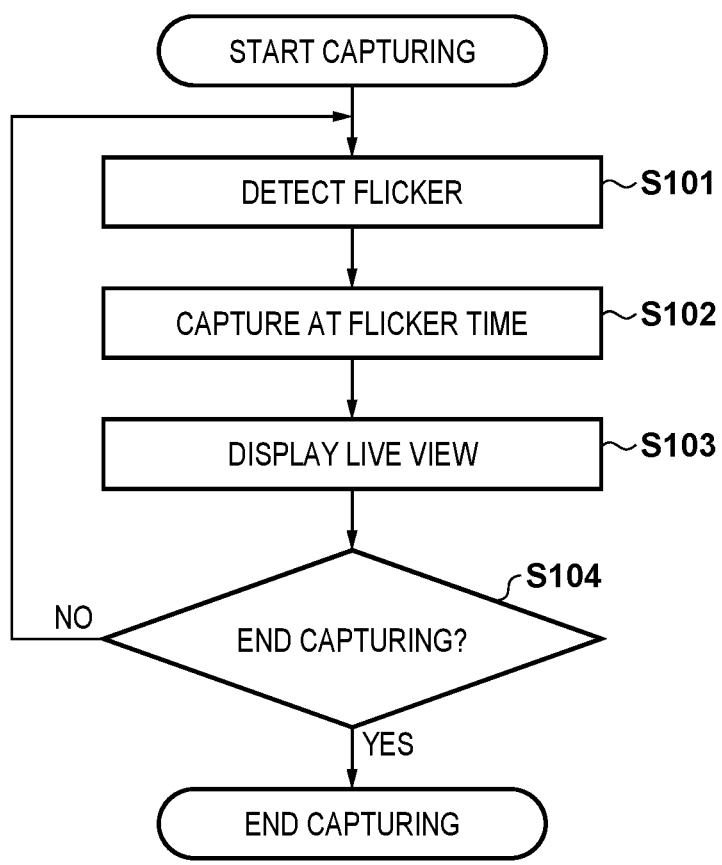
FIG. 2 is a flowchart illustrating an image capturing operation of the digital camera in the embodiment.

FIG. 2 is a flowchart illustrating an image capturing operation of the digital camera 100 in the present embodiment.

When capturing is started, in step S101, the system control circuit 50 detects whether or not a light source is flickering and, if it is flickering, a peak time of a flicker. This flicker detection will be described later with reference to FIGS. 3, 4A, and 4B.

In step S102, the system control circuit 50 performs capturing at a timing at which the flicker can be reduced based on the result of detecting the flicker in step S101. The capturing in which the flicker is reduced will be described later with reference to FIG. 5.

In step S103, the system control circuit 50 displays a live view image in accordance with a display timing. The operation for causing to display the live view image in accordance with the display timing will be described later with reference to FIG. 6.

In step S104, the system control circuit 50 determines whether to continue capturing; if the photographer is instructing to continue capturing, the system control circuit 50 returns the process to step S101; and if the photographer is instructing to end capturing, the system control circuit 50 ends capturing.

Figure 3:
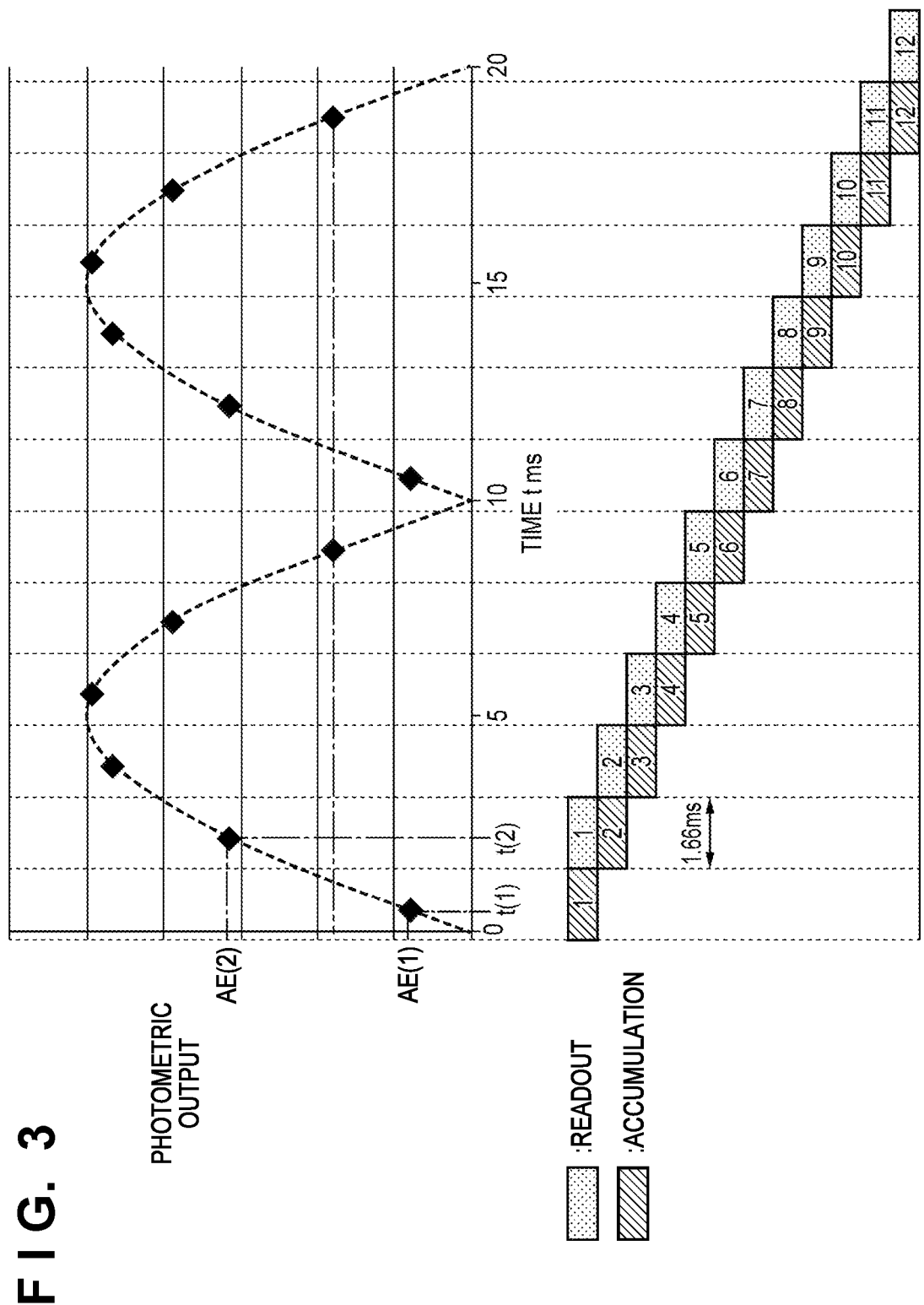
FIG. 3 is a diagram illustrating a relationship between accumulation control and outputted photometric values when a flicker is present.

FIG. 3 is a diagram illustrating a relationship between accumulation control and outputted photometric values when a flicker is present.

In FIG. 3, when a commercial power supply is a frequency of 50 Hz, an n-th accumulation for detecting a flicker is set as "accumulation n", a readout of a result of the accumulation n is set as "readout n", and a photometric value obtained from the result of readout n is set as "AE(n)". As for the time at which each photometric value is acquired, since accumulation is performed for a finite period, the time at which a photometric value AE(n) is acquired is represented by a median of the accumulation period and is set to "t(n)". Incidentally, in FIG. 3, plotting is described only for when n=1 and n=2; however, the same applies to plotting for when n=3 to 12.

Assuming that a single accumulation period for detecting a flicker is 1.66 msec, when a light source frequency is 50 Hz, the emission period of a flicker is 10 ms; 10÷1.66≈6. Therefore, as illustrated in FIG. 3, the same photometric values are obtained in the respective six periods of the cycle regardless of the timing of accumulation. That is, the relationship AE(n)=AE(n+6) holds. Similarly, an emission period of a flicker when a light source frequency is 60 Hz is 8.33 ms; 8.33/1.66≈5. Therefore, the same photometric values are obtained in the respective five periods of the cycle and the relation AE(n)=AE(n+5) holds.

Meanwhile, AE(n) is constant regardless of n in an environment where flicker is not present. From the above, it is possible to determine whether a flicker is present by defining an evaluation value F50 and an evaluation value F60 by Equation (1) and Equation (2), respectively, and comparing them with a threshold Fth and, if present, determine the frequency (emission period) of the flicker.

$$F50 = \sum_{k=0}^{m} |AE(n) - AE(n+6)| \quad (1)$$

$$F60 = \sum_{k=0}^{m} |AE(n) - AE(n+5)| \quad (2)$$

That is, when F50<Fth and F60<Fth hold true, it can be determined that the environment is where a flicker is not present. Further, when F50<Fth and F60≥Fth hold true, it can be determined that the environment is a flicker environment where the emission period T=10 ms (light source frequency 50 Hz). Further, when F50≥Fth and F60<Fth hold true, it can be determined that the environment is a flicker environment where the emission period T=8.33 ms (light source frequency 60 Hz).

A case where both F50 and F60 exceed Fth due to panning or an object moving is also conceivable. In this case, the sizes of F50 and F60 are compared; if F50 is smaller, it is determined that the environment is a flicker environment where the emission period T=10 ms (light source frequency 50 Hz) is determined; and if F60 is smaller, it is determined that the environment is a flicker environment where the emission period T=8.33 ms (light source frequency 60 Hz).

That is, when F50≥Fth and F60≥Fth hold true, if F50≤F60, it is determined that the environment is a flicker environment where the emission period T=10 ms (light source frequency 50 Hz), and if F50>F60, it is determined that the environment is a flicker environment where the emission period T=8.33 ms (light source frequency 60 Hz).

Thus, by calculating the evaluation values F50 and F60, it becomes possible to determine whether a flicker is present in the image capturing environment and, if present, whether the light source frequency is 50 Hz or 60 Hz as well as calculate the emission period T at that time. Also, if a flicker is present, a synchronization signal for a peak position of the amount of light of the flicker is generated. Basically, time t(peak), at which the flicker peaks, is calculated by interpolating 12 photometric values that have been obtained.

Figure 4A:
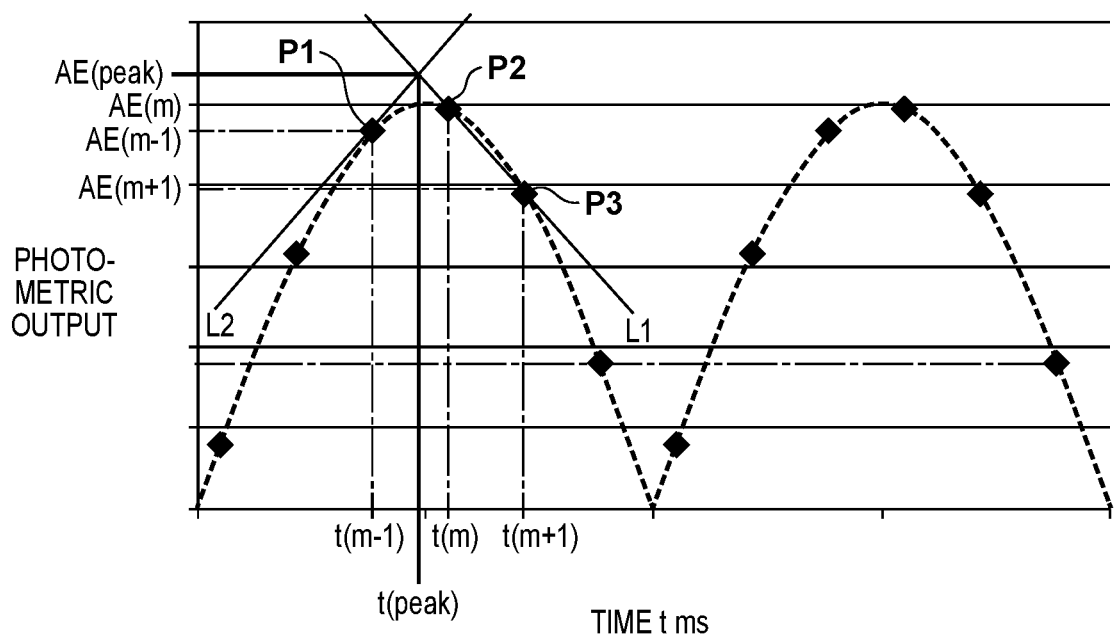
FIGS. 4A and 4B are diagrams illustrating an example of a method for calculating a peak position of a flicker.
Figure 4B:
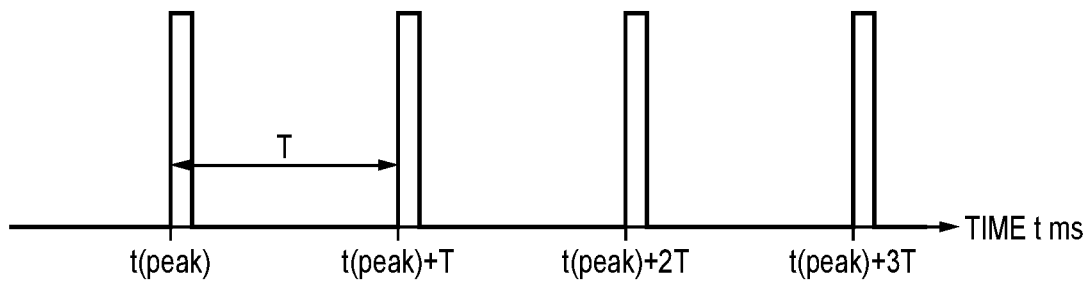

FIGS. 4A and 4B are diagrams illustrating an example of a method for calculating a peak position of a flicker. In FIG. 4A, among AE(1) to AE(12), a point at which the largest output was obtained is set as P2 (t(m), AE(m)), an immediately preceding photometric result point is set as P1 (t(m−1), AE(m−1)), and an immediately succeeding photometric result point is set as P3 (t(m+1), AE(m+1)).

First, a straight line that passes through two points, a point with a smaller value between AE(m−1) and AE(m+1) (P3 in the example of FIG. 4A) and the point P2, is obtained as L1=at+b. Further, a straight line that passes through a point with a larger value between AE(m−1) and AE (m+1) (P1 in the example of FIG. 4A) and has a slope −a is set as L2. Then, by obtaining a point of intersection of the straight line L1 and the straight line L2, time t(peak) of a peak position and a photometric value AE(peak) at a peak can be calculated.

Further, since the emission period T of the flicker has been ascertained before this point, as illustrated in FIG. 4B, a peak synchronization signal, which generates a pulse at each timing of t=t(peak)+nT (n is a natural number), is generated. As described above, when a flicker is present, the emission period, the peak photometric value, and the peak synchronization signal thereof are generated.

Figure 5:
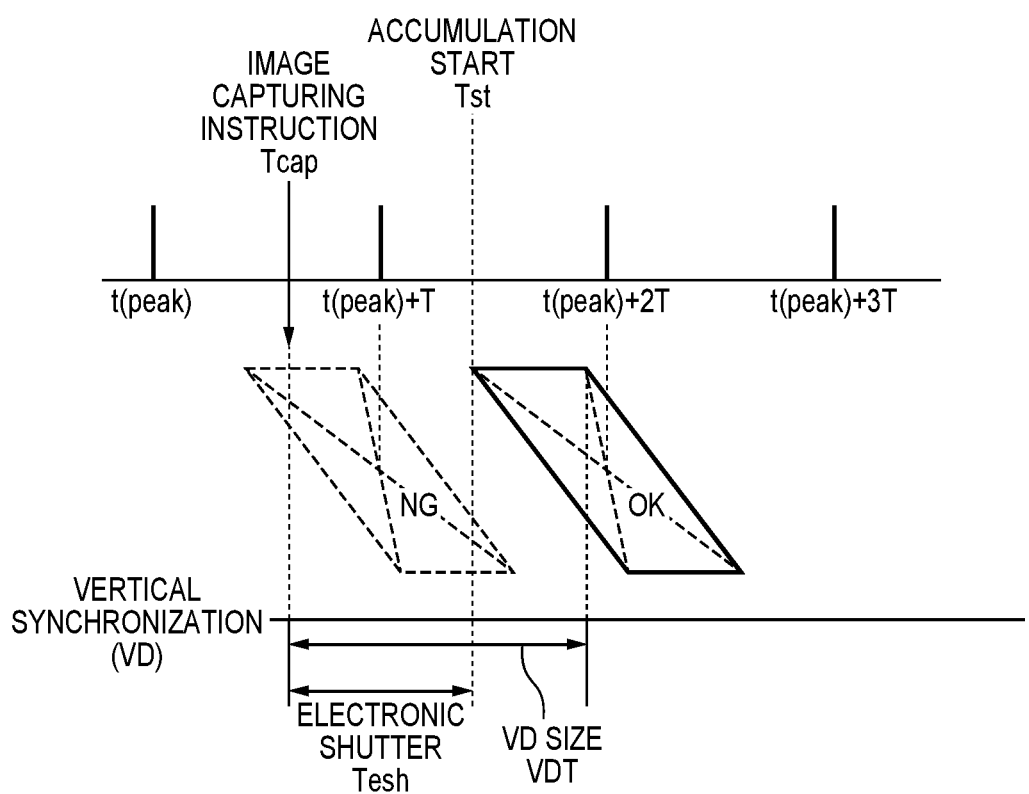
FIG. 5 is a diagram illustrating capturing in accordance with a peak timing of a flicker.

FIG. 5 is a diagram illustrating an operation of capturing a still image at a timing in accordance with a peak position (peak time) of a flicker. In the present embodiment, it is assumed that a still image is to be captured using the electronic shutter function of the image capturing element 14.

When the peak position (peak time) t(peak) of a flicker is detected, the timing of capturing a still image is adjusted in accordance with the timing of an image capturing instruction. First, in FIG. 5, it is determined whether capturing is possible at time t(peak)+T, which corresponds to immediately after an image capturing instruction. In the example of FIG. 5, unless accumulation is started at a timing prior to an image capturing instruction time Tcap, the center of accumulation cannot be adjusted to time t(peak)+T. Therefore, it is determined that capturing at time t(peak)+T is not possible.

Next, at time t(peak)+2T, since an accumulation start time Tst can be set to be after the image capturing instruction time Tcap, it is determined that capturing is possible at time t(peak)+2T.

To capture a still image at time t(peak)+2T, a VD size VDT, which is a period from the image capturing instruction time Tcap to a timing at which a vertical synchronization signal VD occurs, and a period Tesh (electronic shutter period) from the image capturing instruction time Tcap to a reset start time Tst by the electronic shutter for starting the accumulation of the still image are set. Thus, it becomes possible to capture a still image with the center of accumulation at time t(peak)+2T. These values of times and periods are calculated by the following equations, where Tcap is the image capturing instruction time, Tp is the flicker peak time, Tst is the accumulation start time, Texp is the accumulation period, and Trd is the readout period.

Accumulation Start Time=Flicker Peak Time−(Readout Period+Accumulation Period)/2

$Tst = Tp - (Trd + Texp)/2$

Figure 6:
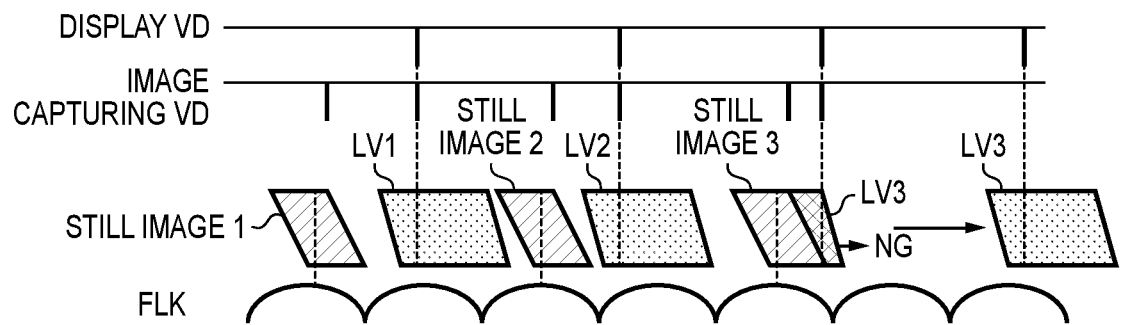
FIG. 6 is a diagram illustrating timings of capturing still images and live view images (LV).

Electronic Shutter Period=Accumulation Start Time−Image Capturing Instruction Time $Tesh = Tst - Tcap$ VD Size=Electronic Shutter Period+Accumulation Period $VDT = Tesh + Texp$ FIG. 6 is a diagram illustrating the timings of capturing a still image (image for storage) and a live view image (image for display).

A still image 1 is captured in accordance with a flicker peak, and then a live view image 1 (LV1) is captured in accordance with an immediately succeeding display timing. A still image 2 and a live view image 2 (LV2) are captured in the same way. For a still image 3, since the still image 3 and the accumulation period of a live view image (LV3) in the next display period overlap, accumulation cannot be performed for the live view image at this timing. Therefore, the image capturing position (image capturing timing) of the live view image (LV3) is shifted to the next display period. To this end, the image capturing position (image capturing timing) is adjusted by extending (delaying) a period of the vertical synchronization signal of the live view image (LV3).

Since a still image is captured in accordance with a peak timing of a flicker, the effects of the flicker can be reduced; however a live view image needs to be captured in accordance with a display timing; therefore, to reduce the effect of the flicker, the accumulation period of a live view image is adjusted. The accumulation period of a live view image is set to be an integer multiple of a period of the flicker. Specifically, when the light source frequency is 50 Hz, the accumulation period of a live view is set to $1/50$ sec or $1/100$ sec, and when the light source frequency is 60 Hz, the accumulation period of a live view is set to $1/60$ sec or $1/120$ sec.

By capturing images and accumulating and displaying live view images as described above, it becomes possible to acquire images of good quality with reduced effects of a flicker even during continuous capturing or moving image capturing. Further, as illustrated in FIG. 6, by simultaneously and periodically repeating a first image capturing operation, which is an operation in which still images are continuously captured (continuous capturing operation), and a second image capturing operation, in which accumulation and display of live view images are performed, it becomes possible to improve the speed of continuous capturing of still images as compared with the case where capturing is performed while switching between the first image capturing operation and the second image capturing operation.

Figure 7:
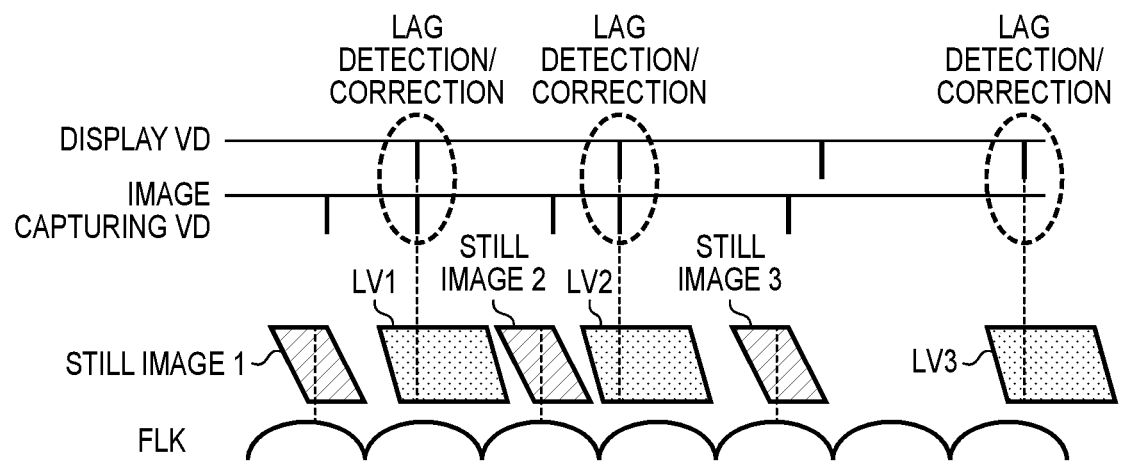
FIG. 7 is a diagram illustrating adjustment of capturing and display timings of live view images.

FIG. 7 is a diagram illustrating adjustment of capturing and display timings of the live view image.

Although the periods of display and the periods of capturing of live view images are approximately coinciding, the driving clock of the image capturing element and the driving clock of the camera side are each a separate clock and may have slight differences, and when differences accumulate over a long time, a lag between capturing and displaying timings of a live view image increases. To contain this lag within a predetermined range, it is necessary to periodically adjust capturing and display timings of a live view image.

This timing adjustment is performed by detecting a lag between an image capturing synchronization signal VD and a display synchronization signal VD of live view images and adjusting the frame size of live view images. Specifically, the time at which the image capturing synchronization signal VD falls and the time at which the display synchronization signal VD falls are measured, and when the lag between the two becomes a predetermined value or more, the frame size of the next live view image is increased or decreased. The electronic shutter period of the image capturing element is adjusted accordingly. With this operation, it becomes possible to display live view images that feels natural.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-063005, filed Apr. 1, 2021, which is hereby incorporated by reference herein in its entirety.

What is claimed is:

1. An image capturing apparatus comprising:
at least one processor or circuit configured to function as following units;
an image capturing unit configured to convert light from an object to an electrical signal;
said at least one processor or circuit further configured to function as a flicker detection unit configured to detect a flicker of a light source using the electrical signal output from the image capturing unit; and
said at least one processor or circuit further configured to function as a control unit configured to cause, in parallel, an execution of a first image capturing operation in which the image capturing unit is caused to periodically capture images for storage and a second image capturing operation in which the image capturing unit is caused to periodically capture images for display, wherein
the control unit: in the first image capturing operation, causes the image capturing unit to capture an image at a timing corresponding to a peak timing of a flicker that has been detected by the flicker detection unit; and in a case where an accumulation period of the image capturing unit in the first image capturing operation and an accumulation period of the image capturing unit in the second image capturing operation overlap, changes a timing of capturing an image by the image capturing unit in the second image capturing operation.

2. The image capturing apparatus according to claim 1, wherein the first image capturing operation is an operation in which still images are continuously captured.

3. The image capturing apparatus according to claim 2, wherein the second image capturing operation is an operation in which a live view image is captured.

4. The image capturing apparatus according to claim 3, wherein the control unit causes the image capturing unit to capture an image for display in accordance with a live view display period.

5. The image capturing apparatus according to claim 1, wherein the first image capturing operation is an operation in which a moving image is captured.

6. The image capturing apparatus according to claim 1, wherein the control unit, in a case where the accumulation period of the image capturing unit in the first image capturing operation and the accumulation period of the image capturing unit in the second image capturing operation overlap, delays the timing of capturing an image by the image capturing unit in the second image capturing operation.

7. The image capturing apparatus according to claim 1, wherein the control unit, in a case of changing the timing of capturing an image by the image capturing unit in the second image capturing operation, in a case where a period of capturing images becomes shorter than a predetermined period, causes the image capturing unit to capture an image at a next period.

8. The image capturing apparatus according to claim 1, wherein the control unit controls the image capturing timing by the image capturing unit such that a center of the accumulation period of the image capturing unit in the first image capturing operation coincides with the peak timing of the flicker.

9. The image capturing apparatus according to claim 1, wherein the control unit changes the timing of capturing an image by the image capturing unit in the second image capturing operation by an adjustment of a vertical synchronization signal and by an electronic shutter function.

10. The image capturing apparatus according to claim 1, wherein said at least one processor or circuit is further configured to function as a detection unit configured to detect a lag between a period of capturing images and a period of display images in the second image capturing operation.

11. The image capturing apparatus according to claim 10, wherein the control unit corrects the lag between the period of capturing images and the period of display images in the second image capturing operation based on a result of detection by the detection unit.

12. The image capturing apparatus according to claim 1, wherein the control unit, in the second image capturing operation, causes the image capturing unit to perform capturing an image in an accumulation period of an integer multiple of a period of the flicker detected by the flicker detection unit.

13. A method of controlling an image capturing apparatus comprising an image capturing unit configured to convert light from an object to an electrical signal, the method comprising:

flicker detecting in which a flicker of a light source is detected using the electrical signal output from the image capturing unit; and controlling in which a first image capturing operation in which the image capturing unit is caused to periodically capture images for storage and a second image capturing operation in which the image capturing unit is caused to periodically capture images for display are caused to be executed in parallel, wherein in the controlling: in the first image capturing operation, the image capturing unit is caused to capture an image at a timing corresponding to a peak timing of a flicker that has been detected by the flicker detecting; and in a case where an accumulation period of the image capturing unit in the first image capturing operation and an accumulation period of the image capturing unit in the second image capturing operation overlap, a timing of capturing an image by the image capturing unit in the second image capturing operation is caused to be changed.

14. A non-transitory computer-readable storage medium operable to store a program configured to cause a computer to execute a method of controlling an image capturing apparatus comprising an image capturing unit configured to convert light from an object to an electrical signal, the method comprising:

flicker detecting in which a flicker of a light source is detected using the electrical signal output from the image capturing unit; and controlling in which a first image capturing operation in which the image capturing unit is caused to periodically capture images for storage and a second image capturing operation in which the image capturing unit is caused to periodically capture images for display are caused to be executed in parallel, wherein in the controlling: in the first image capturing operation, the image capturing unit is caused to capture an image at a timing corresponding to a peak timing of a flicker that has been detected by the flicker detecting; and in a case where an accumulation period of the image capturing unit in the first image capturing operation and an accumulation period of the image capturing unit in the second image capturing operation overlap, a timing of capturing an image by the image capturing unit in the second image capturing operation is caused to be changed.

* * * * *